United States Patent
Yamagami et al.

(10) Patent No.: US 7,424,435 B1
(45) Date of Patent: Sep. 9, 2008

(54) MANAGING SHIPMENT CHARGES FOR INTERNATIONAL TRANSPORTATION OF ITEMS

(75) Inventors: Yuichi Yamagami, Lincoln Park, NJ (US); Michael J. Duciewicz, Hewitt, NJ (US); Patrick Nappi, Little Silver, NJ (US); Joyce McNichol, Kearny, NJ (US); Gabriela Barrales, Dover, NJ (US); Nancy Gordon, Verona, NJ (US)

(73) Assignees: Ricoh Company, Ltd., Tokyo (JP); Ricoh Corporation, West Caldwell, NJ (US)

(*) Notice: Subject to any disclaimer, the term of this patent is extended or adjusted under 35 U.S.C. 154(b) by 1046 days.

(21) Appl. No.: 09/704,434

(22) Filed: Nov. 2, 2000

(51) Int. Cl.
*G06Q 30/00* (2006.01)
*G06F 17/00* (2006.01)

(52) U.S. Cl. .......................... 705/1; 705/400

(58) Field of Classification Search ................ 705/400, 705/401, 414
See application file for complete search history.

(56) References Cited

U.S. PATENT DOCUMENTS

| | | | | |
|---|---|---|---|---|
| 5,070,463 A | * | 12/1991 | Schuricht et al. | ............ 705/404 |
| 5,666,493 A | * | 9/1997 | Wojcik et al. | ................ 705/26 |
| 5,966,697 A | * | 10/1999 | Fergerson et al. | ............. 705/26 |
| 6,356,838 B1 | * | 3/2002 | Paul | ........................ 701/209 |
| 6,571,213 B1 | * | 5/2003 | Altendahl et al. | .............. 705/1 |
| 2001/0027471 A1 | * | 10/2001 | Paulose et al. | .............. 709/203 |
| 2002/0019759 A1 | * | 2/2002 | Arunapuram et al. | .......... 705/7 |
| 2002/0046130 A1 | * | 4/2002 | Monteleone et al. | .......... 705/26 |
| 2005/0021366 A1 | * | 1/2005 | Pool et al. | ...................... 705/1 |

FOREIGN PATENT DOCUMENTS

| | | | |
|---|---|---|---|
| JP | 04-115358 A | * | 4/1992 |
| JP | 10-316211 | | 12/1998 |
| JP | 2000-57477 | | 2/2000 |

OTHER PUBLICATIONS

Gerety: "Zone prices inaugurated for Reynolds division. (Reynolds Metals Co.)"; American Metal Market, Nov. 14, 1986, vol. 94, p.1.*
"TransCanada's incentive-rate plan approved"; American Gas Apr. 6, 1996, vol. 78, No. 3.*
CDNOW's Lating American and Carribean Customers Can Now Get Faster and Cheaper Delivery Service; Skybox.net Announces Shipping Partnership with CDNOW, Aug. 8, 2000, PR Newswire, Financial News, pp. 1-2.*
Press Release Business Wire Jun. 17, 1997, "New System to Enhance Customer Service Support and Reduce Delivery Lead Time".

* cited by examiner

*Primary Examiner*—Jamisue A Plucinski
(74) *Attorney, Agent, or Firm*—Cooper & Dunham, LLP (57) ABSTRACT

A method and system for tracking and making use of variances between amounts billed to a supplier for shipping items from one country to customers in another and amounts billed to the customers in a setting where the supplier uses a carrier such as UPS to ship a consolidated international shipment of numerous individual orders from one country to the other and the individual packages are thereafter distributed in the second country.

18 Claims, 8 Drawing Sheets

```
USLTM28           RICOH CORPORATION            02/23/00
                  REDS FREIGHT CHARGES

FUNCTION: I      (A=ADD C=CHANGE D=DELETE I=INQUIRE)
 CARRIER CODE: UPN ZONE: 4

FREIGHT   LAST  OPER |        FREIGHT   LAST  OPER
   LBS   AMOUNT   UPDATED  ID |  LBS   AMOUNT   UPDATED  ID 1    16.75   01/16/97 MRB |   2    18.50   01/16/97 MRB
    3    20.25   01/16/97 MRB |   4    22.00   01/16/97 MRB
    5    23.75   01/16/97 MRB |   6    25.75   01/16/97 MRB
    7    27.75   01/16/97 MRB |   8    29.75   01/16/97 MRB
    9    31.75   01/16/97 MRB |  10    33.50   01/16/97 MRB
   11    35.25   01/16/97 MRB |  12    36.75   01/16/97 MRB
   13    38.25   01/16/97 MRB |  14    39.75   01/16/97 MRB
   15    41.25   01/16/97 MRB |  16    42.75   01/16/97 MRB
   17    44.25   01/16/97 MRB |  18    45.75   01/16/97 MRB
   19    47.25   01/16/97 MRB |  20    48.75   01/16/97 MRB

COPY FROM A CARRIER CODE:    ZONE:

PF3=RETURN PF7=PRIOR PF8=NEXT PF10=TOP PF12=EXIT
```

(Domestic Freight Conversion Table)

GDS Freight Analysis

|         | Freight Charge From Carrier | Domestic Freight | Variance  |
|---------|-----------------------------:|-----------------:|----------:|
| Jun-99  | 19,336.42                    | 18,900.00        | 436.42    |
| Jul-99  | 28,083.73                    | 29,002.00        | (918.27)  |
| Aug-99  | 17,556.35                    | 18,250.00        | (693.65)  |
| Sep-99  | 15,579.25                    | 15,490.00        | 89.25     |
| Oct-99  | 24,527.13                    | 25,220.00        | (692.87)  |
| Nov-99  | 30,854.96                    | 30,120.00        | 734.96    |
| Dec-99  | 14,166.75                    | 14,380.00        | (213.25)  |
| Jan-00  | 26,310.12                    | 25,920.00        | 390.12    |
| Feb-00  | 29,848.69                    | 29,940.00        | (91.31)   |
| Mar-00  |                              |                  |           |

Fig. 6

MANAGING SHIPMENT CHARGES FOR INTERNATIONAL TRANSPORTATION OF ITEMS

FIELD

This patent specification is in the field of methods and systems for managing shipment charges, particularly for international shipments where a supplier uses an independent shipping entity such as UPS. More specifically, the specification pertains to tracking the charges the shipping entity bills to the supplier and the supplier bills to customers for specific items.

BACKGROUND

It many industries, manufacturers warehouse spare parts and other goods that customers can order for delivery directly or through intermediaries such as repair shops or distributors. In order to ensure short delivery times, a supplier can ship from the closest one of a number, preferably a high number, of geographically dispersed, each well stocked. However, this can get expensive, and can unduly increase the cost of the goods to the customer. On the other hand, keeping only a single facility or a small number of facilities, works against short delivery times and low shipping charges. This is exacerbated when the supplier services a worldwide market, where both delivery times and shipping charges can vary greatly depending on the customer's location. It is important, therefore, to find ways to reconcile these conflicting requirements, particularly where the supplier services a worldwide market, in a manner that benefits both the supplier and the customer.

The assignee hereof has found an efficacious solution to this dilemma and has been using it for more than a year. It involves shipping to customers in this country from an overseas location, but doing this in a special way. The good ordered by a customer that business day are packaged in a separate package addressed to that customer, as is conventional, but then these individually addressed packages are bundled into a single international shipment. This is shipped by air that day, using an independent shipping entity such as UPS. After clearing customs, the bundled package is divided into individual packages and these are shipped in the same manner as if they started out from a supplier facility in this country and were handed to a shipping entity such as UPS in this country. In this manner, the goods get to this country and clear customs quickly and conveniently and at a lower cost than if shipped as individual orders. In addition, the supplier can maintain a warehouse facility in this country for some goods, but it need not be as fully stocked as the overseas warehouse.

From the customer's point of view, this operates as though the order was shipped from a warehouse in the United States. The customer is invoiced for shipping charges as though the goods were shipped from a location in the United States, for example at the rate a shipper such as UPS would charge for a shipment of the appropriate size and weight from a location in the U.S. to the zone where the customer is located. From the supplier's (e.g., manufacturer's) point of view, this makes it possible to warehouse all, or most, of the spare parts and supplies for customers in the U.S. at a location close to the manufacturing facilities (e.g., in Japan), and make a long term arrangement with the shipper that would result in overall shipping charges to the supplier that are less than the cumulative charge the shipper would require for shipping individual packages from the overseas location to customers in the United States. The supplier can thus achieve many of the benefits of supplying from a location in the U.S. without incurring the expense of maintaining duplicate inventories in other countries. The customer can benefit by paying only local shipping charges and getting a short delivery time consistently, overcoming the problems that may arise when different supply locations may differ in what they stock at a particular time and when individual packages need to clear customs.

This approach applies not only to spare parts and supplies such as consumables but to other goods and to shipments from any first country to any second country, or from one geographical area to another.

SUMMARY

When orders are shipped as described above, conventional methods of tracking shipping charges may not apply. For example, the cost to the supplier for shipping a part to a customer may not be, and typically is not, the same as the charge billed to the customer. The charge to the customer in this country may be the same as if the order was shipped as an individual package from a location in this country by a known shipper such as UPS. However, the charge to the supplier has different components that may be different to separate and may add up to a figure different from the charge billed to the customer. It is believed desirable to find a way to track and manage the charges and costs to the supplier relative to those billed to customers, and this patent specification is directed to a way to do so.

Accordingly, an object of the method and system disclosed herein is to manage the charges for shipping such that the supplier (e.g., manufacturer) would keep track of and use information regarding differences between first shipping charges such as the actual charges to the supplier for shipping items to customers from an actual shipping location and the charges applicable for shipping from a virtual location such as a virtual location in a different country. Other objects will become apparent from this summary and the detailed description of preferred embodiment below.

DETAILED DESCRIPTION OF PREFERRED EMBODIMENTS

Figure 1:
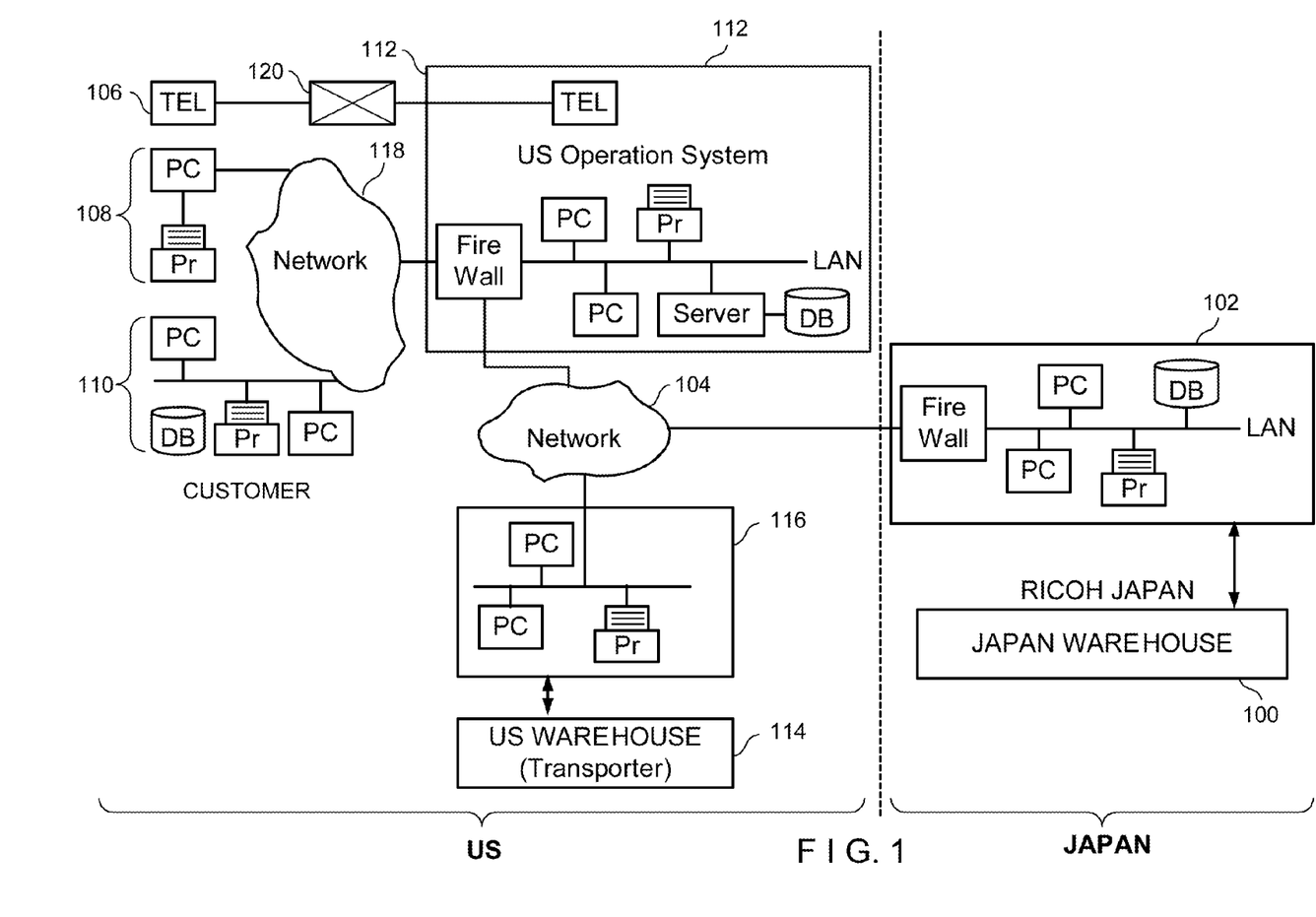
FIG. 1 illustrates a system for managing shipments and shipping charges in accordance with a preferred embodiment.

FIG. 1 illustrates an interconnection through one or more networks between customers and a supplier facility in one area, the United States in this example, and a supplier facility that includes a warehouse in another location, Japan in this example. The supplier facility in Japan includes a warehouse 100 for good such as spare parts for equipment and supplies. The equipment can include copiers, printers, facsimile machines and other office equipment. Warehouse 100 can include an order fulfilling facility, or may use a different order fulfilling entity, or an outside service. Also included in the Japan facilities of the supplier is a computer operation 102 that can include one or more personal computers (PC) or other computers that can be interconnected through a local network (LAN) or some other network with each other and with support equipment such as one or more printers (Pr) and one or more servers (not illustrated) and database storage facilities (DB). The computer facility 102 and the warehouse/order fulfilling facility 100 can be interconnected to exchange information regarding orders and shipments.

Preferably through a firewall, the supplier facilities in Japan connect with a network 104 such as a proprietary network or a public network such as the Internet which extends to the U.S. At the U.S. side, there are customers at locations such as 106, 108 and 110, a U.S. operation system 112 and shipper facilities such as a U.S. warehouse 114 and its computer system 116, all connected for the exchange of information through a network 118 and network 104. Networks 104 and 108 can be the same public network, e.g., the Internet, or they may be partly or fully proprietary networks and can use the public telephone switching network or other third party communication links as needed or desired.

The customer locations can be equipped differently and can communicate orders for parts or other items in different ways. For example, customer location 106 can be equipped only with a telephone, and the customer can call in orders by connecting through a public switching system 120 with an operator at a telephone (TEL) at the supplier's U.S. operation system 112. The customer at location 108 can communicate using a personal computer (PC) at location 108, through network 118, with a computer at system 112 that comprises one or more personal computers (PC) and supporting equipment such as the illustrated server and database storage (DB) interconnected through a local area network (LAN) or in some other way, and preferably protected with a fire wall that also connects to network 104. The customer at location 110 can have additional facilities such as one or more personal computers (PC) and supporting equipment such as a printer (Pr) and a database storage (DB) interconnected by a local area or some other network and communicating with system 112 in a manner similar to that of customer location 108. U.S. warehouse 114 communicates with its computer system 116, which in turn communicates with the other illustrated facilities through network 104, preferably through a suitable firewall. The customers at locations such as 106, 108 and 110 can be individuals, businesses, repair facilities, distributors or other entities. The items to be shipped to them can be spare parts or other items.

Figure 2A:
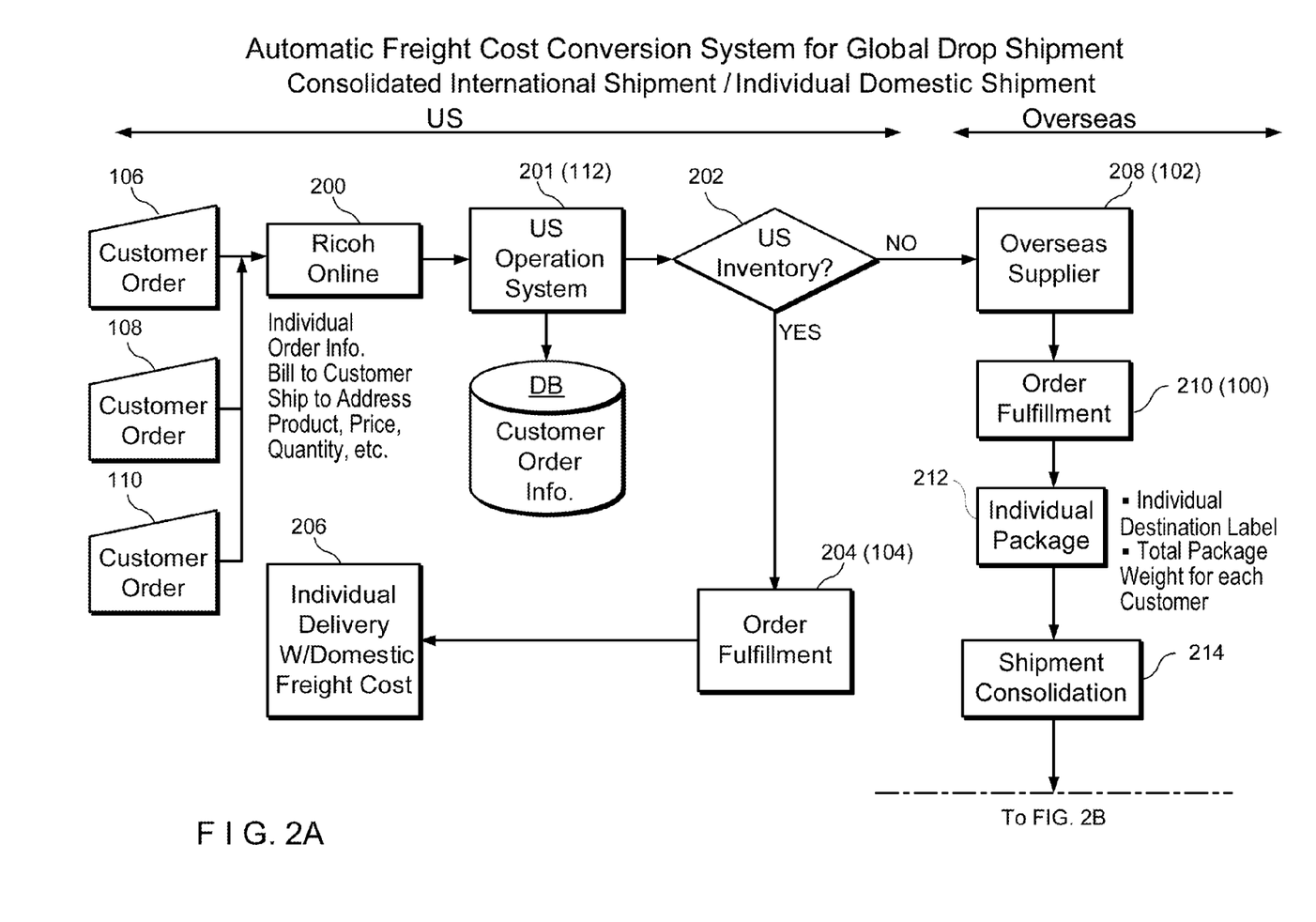
FIG. 2 is a more detailed functional block diagram illustrating a preferred embodiment.
Figure 2B:
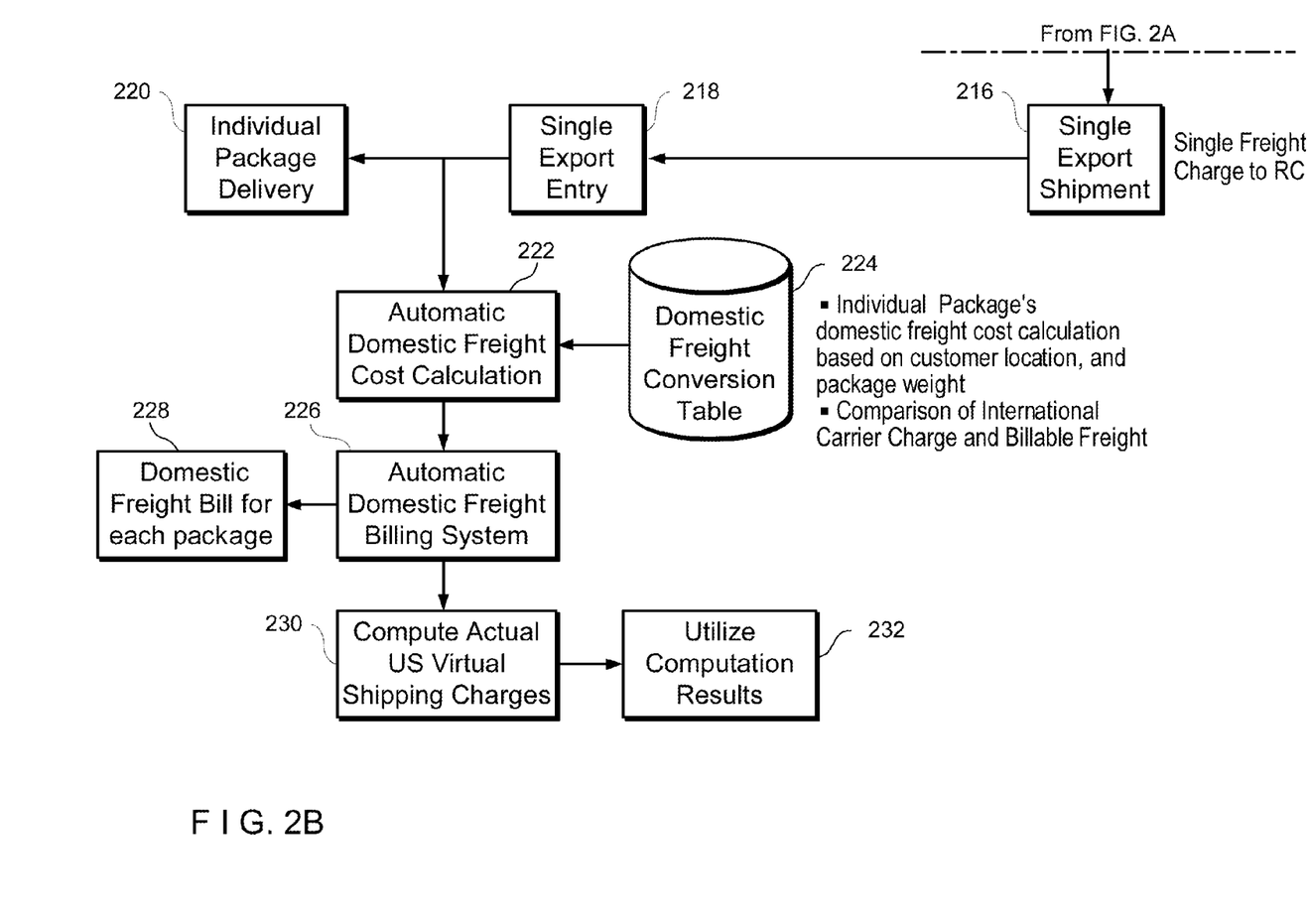

An example of an operation of the system of FIG. 1, and of the shipping or freight cost conversion discussed in greater detail below in connection with FIGS. 3-6, are illustrated in the functional block diagram of FIG. 2. Referring for now to FIG. 2, customer orders from locations such as 106, 108 and 110 are delivered through a network 200 designated here Ricoh Online to U.S. operation system 201 that can be similar to or the same as system 112 earlier discussed. Each order preferably includes information such as the identity of the customer and the party to be billed (if different from the customer), shipping and billing addresses for the item being ordered, an identification of the product (part or other item) being ordered, a price, a number of items, and possibly additional or different information needed or desired in order to fulfil the order. U.S. operation system 201 process the orders received from customers, storing pertinent information in a Customer Order Information Database (DB).

The processing of orders in a preferred embodiment includes the following main steps that can be carried out at the supplier's U.S. facilities. At step 202, the process tests whether the ordered items is in inventory in the U.S. (e.g., in a warehouse such as 114 or some other U.S. warehouse maintained by or for the supplier). This test can be made by consulting a database such as DB at the U.S. Operation System 201 that maintains and updates information on what items have been shipped to thereto and what items have been shipped out and, thus, on what items are available for shipment from the U.S. facility. If the answer at step 202 is yes, order fulfillment takes place at the U.S. warehouse at step 204 and the ordered item is shipped and delivered to the customer at step 206, e.g., by using an individual delivery with a shipper such as UPS. The customer can be invoiced or otherwise charged for shipping in an amount that can take into account factors such as the weight and size of the item, the shipping distance, and delivery time. Alternatively, the supplier can omit one or more of these factors, or charge a flat amount per shipment, or make no charge for shipment.

If the test at step 202 determines that the ordered item is not in inventory in the U.S., order information is delivered to an overseas supplier 208 that can be similar to or the same as system 102 of FIG. 1, and the following steps are carried out at overseas facilities. Order fulfillment takes place at step 210 that can perform functions similar to or the same as warehouse 100 of FIG. 1. The ordered items are packaged into individual packages for respective individual customers at step 212, with an individual destination (address) label to the individual customer and preferably with an indication of parameters such as the weight of the individual package for the customer. At step 214 a number of individual packages for respective customers are consolidated into, and are packaged into, a single shipment. For example, orders received in a single period such as a business day, are consolidated into a single package. The consolidated package is shipped from Japan at step 216 as a single export shipment, at a single shipping charge to the supplier from a shipper such as UPS.

The following steps take place in this country. At step 218, the consolidated shipment is received in the U.S. and is processed as an import entity through customs and otherwise. At step 220, the consolidated package is divided into the original individual packages, which are shipped to the respective customers for individual package delivery, preferably by the same shipper. At step 222, a calculation is made of the domestic freight (shipping) charges applicable to the respective individual packages. This calculation uses a domestic freight conversion table from a database 224. As a non-limiting example, the table contains information identifying the shipping charge that a shipper such as UPS would charge for delivery of an individual package to the customer from a virtual domestic (U.S.) location, preferably based on factors such as the package weight and/or size and a geographical zone in which the customer is located. The calculations at step 222 provide charging information from which an automatic domestic freight billing system prepares shipping bills for the respective packages and customers at step 226. These bills are sent or otherwise delivered to the respective customers at step 228, e.g., together with the packages shipped at step 220 or in some other way, electronically or as hard copies.

Additional processing is carried out in order to manage the shipping charges internally, taking into account the fact that there may be, and typically are, differences between the amount the customer is billed for shipping a package and the amount applicable to that package but actually charged to the supplier. To this end, at step 230 the process computes such differences, in a manner discussed in more detail below, and at step 232 the results of such computation are utilized, e.g., for internal management, cost accounting and allocation purposes, for planning purposes, or for some other purpose.

Figure 3:
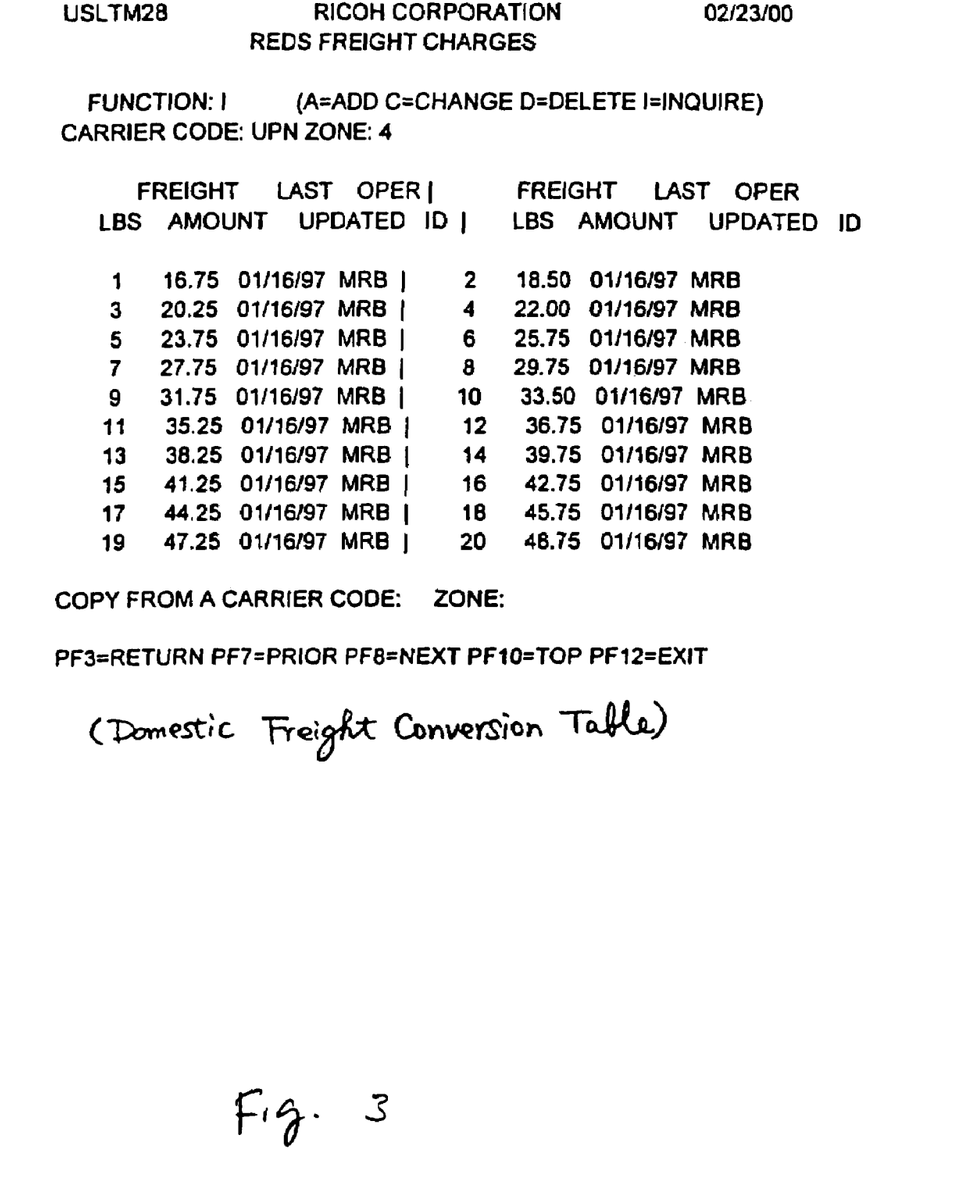
FIG. 3 illustrates a table illustrating charges for individual shipments from a virtual shipping location to customers in a particular zone, used in practicing a preferred embodiment.
Figure 4:
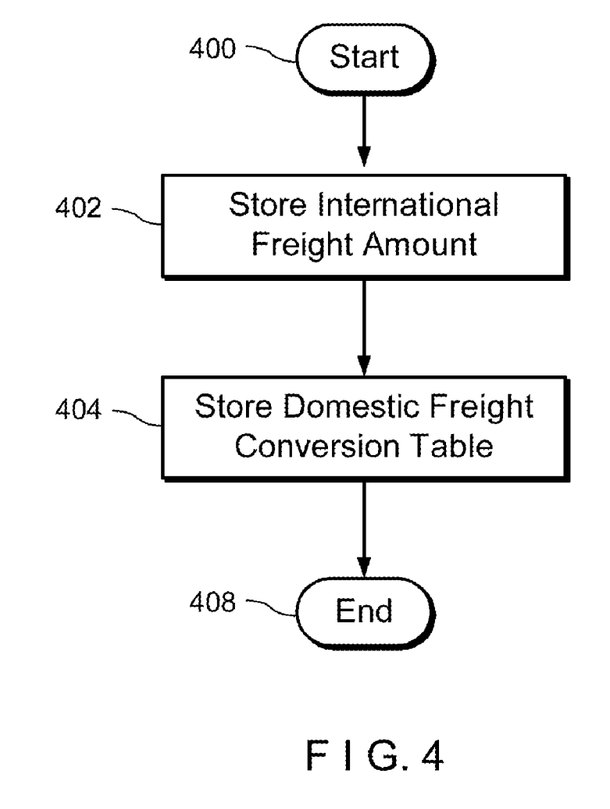
FIG. 4 is a flow chart illustrating steps in a precess implementing a preferred embodiment.

Referring to FIG. 4, the process in a preferred embodiment includes providing a database of international freight amounts and one or more domestic freight conversion tables. The process starts at step 400 and at step 402 stores in the appropriate database applicable international freight amounts. For example, assuming in a simplified example that there is only one consolidated shipment from a first country (Japan) facility to customers in a second country (U.S.), the entry in the database can be the actual dollar amount that the shipper (e.g., UPS) has charged the supplier for this consolidated shipment. The amount can take into account any arrangements between the supplier and shipper that would affect it, such as long term contract provisions, volume discounts, penalty charges, etc. The information stored at step 402 can be kept accessible in various ways, such as by day, week, month, etc., by shipping order number, by shipper, etc. It can include additional information such as information regarding the individual packages in the consolidated shipment, such as the identity of the items included, the identity of the customers, addresses of customers, etc. At step 404, the database is supplemented with one or more domestic freight conversion tables, for example tables such as illustrated in FIG. 3. Additional tables can be stored and used for different purposes, such as for shipping to customers that have different arrangements with the supplier, for shipping via a different carrier, for slower but less expensive shipping, etc. The process may end at step 408.

Figure 5A:
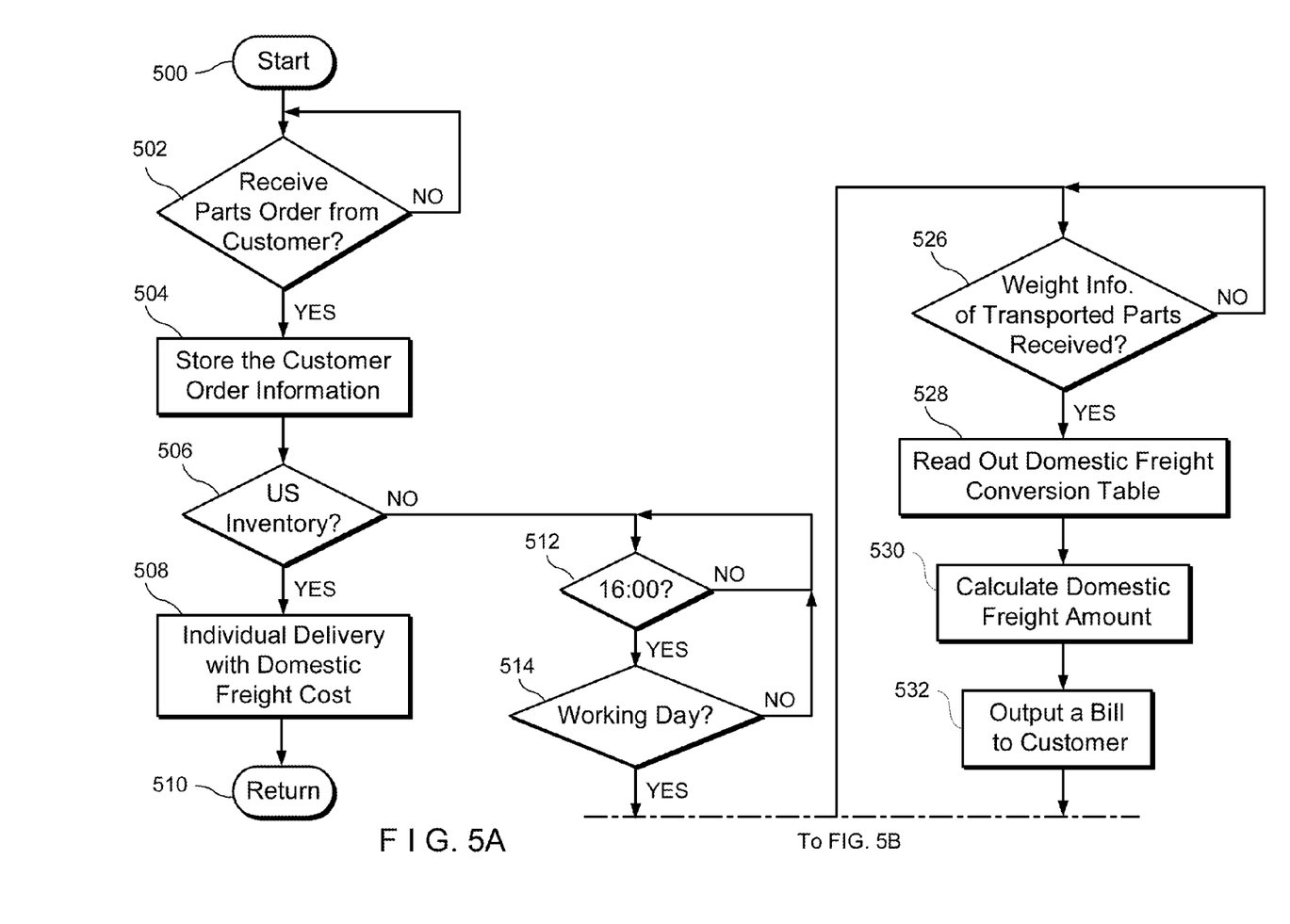
FIG. 5 is a flow chart illustrating other steps in a process implementing a preferred embodiment.
Figure 5B:
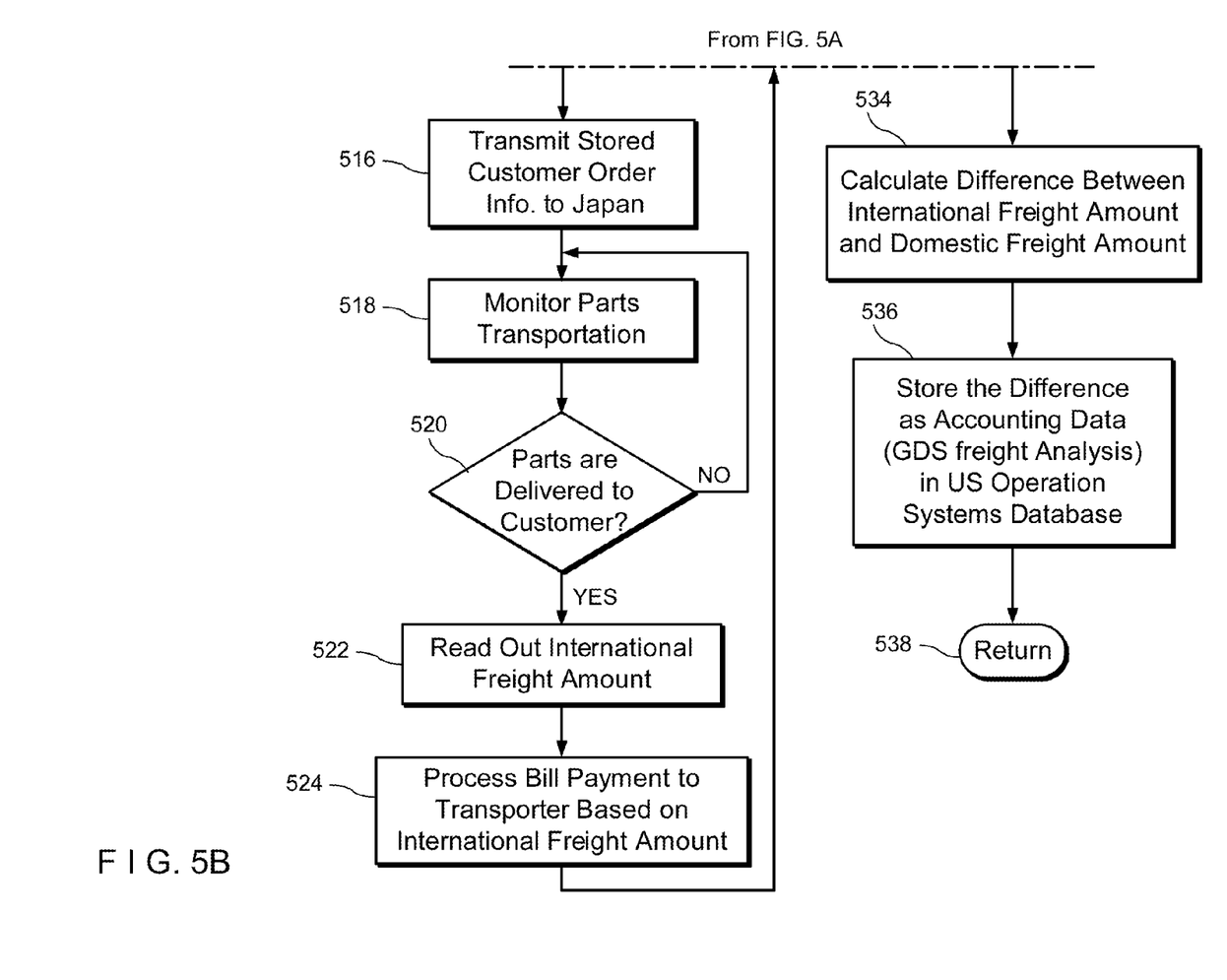

Referring to FIG. 5, a flowchart of main steps in a process implementing a preferred embodiment starts at step 500 and at step 502 checks if an order has been received from a customer and cycles through this check until the process finds that a customer order has been received. Then, at step 504 the process stores the customer order information in the appropriate database, and at step 506 checks the appropriate database to see if the ordered item or items are in inventory at a U.S. facility. If the answer at step 506 is yes, an individual order fulfillment from the U.S. warehouse is carried out at step 508, in the manner earlier discussed in connection with FIG. 2, and the process returns at step 510 to step 500. These steps typically are carried out in the one country, the U.S. in this example.

If the answer at step 506 is no, the order needs to be filled from the overseas facility. To this end, the following steps typically take place in another country, Japan in this example. At step 512 the process cycled through checking if the day has ended and, when 4 PM has come, cycles at step 514 through checking if the day is a business day. After both steps 512 and 514 give yes answers, at step 516 the process transfers to the overseas facility the customer orders that have been received at step 502 and stored at step 504 but have not been sent for fulfilment to the U.S. facility (because step 506 has determined that the ordered items are not in inventory in the U.S.). Of course, the orders transferred at step 516 are those received over the applicable time period, typically since the last business day. In response to the orders transmitted at step 516, the ordered parts are assembled at the overseas facility, in individual packages that are addressed to the respective customers and then are consolidated into a single international shipment. This shipment is turned over to a shipping entity such as UPS, transported to the U.S. and cleared through customs. The individual packages are then shipped as such to the respective customers. The conventional tracking information that the shipping entity keeps is shared with the supplier to the extend needed to monitor the order transportation.

Step 518 of the process uses such tracking information and possibly other information regarding the shipment that the supplier keeps, to monitor the transportation of the ordered items from the overseas facility to the ultimate individual customers. At step 520 the process cycles through checking if the orders have been delivered to customers, using at least in part tracking information from the shipping entity. After step 520 determines that the orders have been delivered to the customers, the process at step 522 reads from the database information regarding the international freight amount, stored in step 402 of FIG. 4. At step 524 the process prepares the information needed to pay the shipping entity for the international freight shipment based on the data step 522 has determined.

In order to prepare and send appropriate bills to customers that include a shipping charge, the process carries out the following steps, typically at a U.S. facility. A step 526 the process cycles through checking if information has been obtained regarding the weight of the items in the individual packages received as a part of the consolidated shipment from overseas. This information can be obtained from a database that identifies a weight for each of the items that a customer can order, and information that identifies the item(s) in each respective individual package in the consolidated shipment. After step 526 determines that the weight information has been received, at step 528 the process consults one or more domestic freight conversion tables, using information stored at step 404 of FIG. 4. Based on this information, at step 530 the process calculates the appropriate domestic freight amount to be charged to each customer for the shipment from a virtual location in the U.S. to the customer's location, and at step 532 outputs a respective bill to each customer. The bill can be only for the shipping charge, or it can be a bill that includes charges for the ordered items as well. The bill is sent to the customer in a conventional manner.

In order to keep track of differences between the shipping charges to the supplier and to the customer, and make use of the calculated differences, at step 534 the process calculates such differences by using information between the international freight amount read at step 522 and the domestic freight amounts calculated at step 530 for the packages in the respective consolidated shipment. Because of the manner in which these two types of freight charges are levied, typically there will be differences, positive or negative. For example, the supplier can bill $15 to each of 100 customers for shipping charges, but the shipping entity may bill the supplier a total of $14,500 (or a total of $16,000) for shipping the consolidated package of those 100 orders from the overseas facility, processing it through customs and then delivering the individual orders to the customers. In this example, the difference step 534 calculates will be a gain of $500 (or a loss of $1,000) for the supplier. At step 536, the process stores the calculated difference in the appropriate database, and carries out required accumulation and processing of information, and at step 538 returns to step 500.

Figure 6:
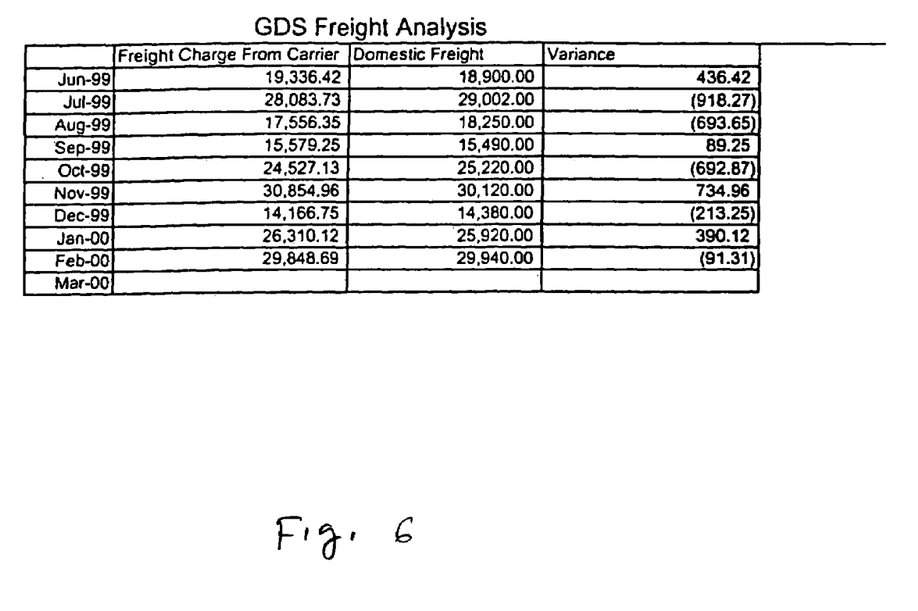
FIG. 6 illustrates results of an analysis of shipping charges.

The data stored at step 536 for each business day, or some other period, can be processed and used in a variety of ways. For example, it can be used in step 536 to produce a Freight Analysis of the type illustrated in FIG. 6, where information is by month. Specifically, FIG. 6 shows by month (1) the freight charges from the carrier to the supplier (e.g., from UPS to a manufacturer such as the assignee of this application), (2) the freight charges actually billed by the supplier to customers, and (3) the variance, i.e., the difference between these two cumulative amounts for the month. Many other analysis formats are possible with the data stored at step 536. The results can be used for a number of purposes related to internal tracking and assessment of the supplier's business.

It should be clear that the disclosure above is specific to preferred embodiments given as examples, and that many variations and additions are within its scope. For example, the order of execution of steps can vary, where the operations take place can be changed, etc.

What is claimed is:

1. A method for a supplier to manage shipping charges for transportation of items by a shipping entity to customers of the supplier, comprising the computer-implemented steps of:

providing a first shipping charge corresponding to an actual charge by the shipping entity to the supplier for transportation of items by the shipping entity from one or more actual supplier locations to a customer location;

providing a second shipping charge corresponding to a shipping charge by the supplier to the customer and calculated by reference to charges applicable to shipment of the items to the customer from one or more virtual supplier locations that are different from the one or more actual supplier locations, said shipping charge by the supplier to the customer being determined without reference to said actual charge by the shipping entity to the supplier for transportation of said items to the customer location;

computing a difference between the first shipping charge and the second shipping charge; and utilizing the computed difference, after said second shipping charge has been billed to the customer, to account for unbilled shipping costs in a predetermined period of time.

2. The method of claim 1, further comprising utilizing said computed difference between (i) the first shipping charge based on said actual charge by the shipping entity and (ii) the second shipping charge corresponding to said shipping charge by the supplier to the customer, for product planning.

3. The method of claim 1, further comprising utilizing said computed difference between (i) the first shipping charge based on said actual charge by the shipping entity and (ii) the second shipping charge corresponding to said shipping charge by the supplier to the customer, for internal cost accounting.

4. A method for a supplier to manage shipping charges for transportation of items by a shipping entity to customers of the supplier, comprising the computer-implemented steps of:

(a) receiving, by the supplier, an order for specified items from a customer;

(b) providing to the customer an indication of an amount charged to the customer for shipping the specified items to a customer location;

(c) arranging for shipping by the shipping entity of the items ordered in step (a), from one or more actual supplier locations to the customer location, and receiving by the supplier an actual charge by the shipping entity to the supplier for transportation of the ordered items from said one or more actual supplier locations to the customer location;

(d) computing a first shipping cost based on said actual charge by the shipping entity received in step (c);

(e) determining a second shipping charge corresponding to the actual amount charged by the supplier to the customer in step (b), said actual amount charged being determined (i) based on shipment of the ordered items to the customer location from one or more virtual supplier locations that are different from the one or more actual supplier locations, and (ii) without reference to said actual charge by the shipping entity to the supplier for transportation of said ordered items to the customer location;

(f) computing a difference between the first shipping cost determined in step (d) and the second shipping charge determined in step (e); and (g) utilizing the computed difference from step (f) for internal cost accounting, after said indication of the amount charged to the customer for shipping has been provided in step (b).

5. The method of claim 4, wherein said indication of the amount charged by the supplier to the customer for shipment of the ordered items to the customer location is provided in step (b) without reference to said actual charge by the shipping entity for transportation of said ordered items from step (c).

6. The method of claim 4, further comprising utilizing said computed difference from step (f), between (i) the first shipping cost based on said actual charge by the shipping entity and (ii) the second shipping charge corresponding to said actual amount charged by the supplier to the customer, for product planning.

7. The method of claim 4, further comprising utilizing said computed difference from step (f), between (i) the first shipping cost based on said actual charge by the shipping entity and (ii) the second shipping charge corresponding to said actual amount charged by the supplier to the customer, for internal management and tracking of unbilled costs of operations.

8. The method of claim 4, further comprising utilizing said computed difference from step (f), between (i) the first shipping cost based on said actual charge by the shipping entity and (ii) the second shipping charge corresponding to said actual amount charged by the supplier to the customer, for internal assessment of operations.

9. The method of claim 4, wherein the one or more actual supplier locations are in a first country, the customer location is in a second country, and said one or more virtual supplier locations are in said second country.

10. The method of claim 9, wherein said items are shipped from the first country to the second country in consolidated international shipments containing packages for multiple customers, and the consolidated international shipments are divided in the second country into individual shipments to the respective customers.

11. A method for a supplier to manage shipping charges for transportation of items by a shipping entity from a first country to customers of the supplier in a second country, comprising the computer-implemented steps of:

(a) receiving by the supplier from each of a plurality of said customers in the second country a corresponding order for specified items;

(b) providing to each customer an indication of an amount charged to the customer for shipping from a virtual location in the second country to a customer location the items in the order received from the customer in step (a);

(c) fulfilling, in the first country, the orders received in step (a) from said plurality of said customers, packaging the ordered items in the first country into individual packages addressed to the respective customers, and consolidating the individual packages into a collective international shipment;

(d) arranging for shipping by a first shipping entity of the collective international shipment from step (c) as a single package from the first country to the second country, and receiving by the supplier a first actual charge by the first shipping entity to the supplier for transportation of the collective international shipment from the first country to the second country;

(e) dividing the collective international shipment in the second country into said individual packages, arranging for transportation by a second shipping entity of the individual packages to respective customer locations in the second country, and receiving by the supplier a bill of second actual charges by the second shipping entity to the supplier for said transportation of the individual packages to respective customer locations in the second country;

(f) computing a first shipping cost specific to transportation of one of said individual packages to the corresponding customer, based on said first actual charge by the first shipping entity received in step (d) and said second actual charges by the second shipping entity received in step (e);

(g) determining a second shipping charge corresponding to the actual amount charged by the supplier in step (b) for transportation of the one individual package to the corresponding customer, said actual amount charged in step (b) being determined based on shipment of the individual packages from a virtual location in the second country to said customers, and without reference to said first actual charge by the first shipping entity received in step (d) and said second actual charges by the second shipping entity received in step (e);

(h) computing a difference between the first shipping cost and the second shipping charge; and (i) utilizing the computed difference from step (h) for internal management of unbilled costs, after said indication of the amount charged to the customer for shipping has been provided in step (b).

12. The method of claim 11, wherein said amount charged by the supplier to the customer for shipment of the ordered items to the customer location is provided in step (b) without reference to said first actual charge by the first shipping entity from step (d) and said second actual charge by the second shipping entity from step (e).

13. The method of claim 11, further comprising utilizing said computed difference from step (i) for product planning.

14. The method of claim 11, further comprising utilizing said computed difference from step (i) for freight analysis on a month-by-month basis.

15. The method of claim 11, further comprising utilizing said computed difference in tracking unbilled shipping costs.

16. The method of claim 11, further comprising utilizing said computed difference in assessing operations of the supplier.

17. The method of claim 11, wherein said first and second shipping entities are the same entity.

18. The method of claim 1, wherein said shipping charge by the supplier to the customer being determined by using a freight conversion table setting forth shipping rates from said one or more virtual supplier locations, said shipping rates being established in said freight conversion table without reference to said actual charge by the shipping entity to the supplier for transportation of said items to a customer location.

* * * * *